US012807742B2

(12) United States Patent
Dawson et al.

(10) Patent No.: US 12,807,742 B2
(45) Date of Patent: Nov. 24, 2026

(54) AQUEOUS FORMULATIONS

(71) Applicant: Independence Oilfield Chemicals LLC, The Woodlands, TX (US)

(72) Inventors: Jeffrey C. Dawson, Conroe, TX (US); Chao Yang, Katy, TX (US); Kurt W. Hoeman, Houston, TX (US)

(73) Assignee: Independence Oilfield Chemicals LLC, The Woodlands, TX (US)

( * ) Notice: Subject to any disclaimer, the term of this patent is extended or adjusted under 35 U.S.C. 154(b) by 756 days.

(21) Appl. No.: 18/118,917

(22) Filed: Mar. 8, 2023

(65) Prior Publication Data

US 2023/0322977 A1 Oct. 12, 2023

Related U.S. Application Data

(60) Provisional application No. 63/329,562, filed on Apr. 11, 2022.

(51) Int. Cl.
*C08F 22/38* (2006.01)
*C08K 3/28* (2006.01)

(52) U.S. Cl.
CPC ................ *C08F 22/38* (2013.01); *C08K 3/28* (2013.01)

(58) Field of Classification Search
CPC .................................. C08F 22/38; C08K 3/28
See application file for complete search history.

(56) References Cited

U.S. PATENT DOCUMENTS

| | | | |
|---|---|---|---|
| 2,761,840 A | 9/1956 | Brown et al. | |
| 3,349,032 A | 10/1967 | Krieg | |
| 4,366,074 A | 12/1982 | McLaughlin et al. | |
| 5,097,904 A | 3/1992 | Himes | |
| 5,160,642 A | 11/1992 | Schield et al. | |
| 5,197,544 A | 3/1993 | Himes | |
| 7,081,212 B2 | 7/2006 | Marin | |
| 7,601,675 B2 | 10/2009 | Poelker et al. | |
| 2004/0087448 A1* | 5/2004 | Smith | C09K 8/54 507/100 |
| 2012/0157356 A1 | 6/2012 | Dawson et al. | |
| 2018/0112118 A1* | 4/2018 | Wu | C09K 8/88 |
| 2020/0181481 A1 | 6/2020 | Dawson et al. | |
| 2022/0002610 A1* | 1/2022 | Melbouci | C09K 8/602 |

FOREIGN PATENT DOCUMENTS

| | | |
|---|---|---|
| CN | 100431985 C | 11/2008 |

OTHER PUBLICATIONS

International Search Report (ISR) for PCT/GB2023/050541 mailed May 30, 2023 (4 pages).
Written Opinion (WO) for PCT/GB2023/050541 mailed May 30, 2023 (8 pages).

* cited by examiner

*Primary Examiner* — Jiangtian Xu

(74) *Attorney, Agent, or Firm* — Jason A. Smith; Shumaker, Loop & Kendrick, LLP

(57) ABSTRACT

An aqueous formulation for use in slick water fracturing, water treatment, enhanced oil recovery, drilling, erosion control, dust abatement or mining flotation operations includes (i) one or more than one polymer (AA) which is a water-soluble polymer; (ii) water; (iii) one or more than one quaternary ammonium compound; and (iv) one or more than one scale inhibitor.

33 Claims, No Drawings

AQUEOUS FORMULATIONS

FIELD OF THE INVENTION

The present invention relates to aqueous formulations and particularly, although not exclusively, relates to the use of such formulations in slick water fracturing, water treatment, enhanced oil recovery, drilling, erosion control, dust abatement and mining flotation operations.

BACKGROUND OF THE INVENTION

Hydraulic fracturing is a process used to produce oil and gas from unconventional reservoirs such as coal beds, tight sandstones and shales. In this process, a fracturing fluid is injected at a rate and pressure necessary to cause formation failure by inducing fractures or cracks in the formation. These cracks originate at the well-bore and radiate out into the formation. The common practice in unconventional reservoirs is to initiate entry into the reservoir with a small slug of acid pumped at low rates followed by injection of a low viscosity water pumped at increasing rate until the design pump rate is achieved. These high rates typically can range from 50 to 100 barrels per minute. In order to pump at these high rates, small amounts of friction reducers are added to the fluid. The low viscosity, friction reducer assisted fluids are referred to as slick-water and the process or treatment is referred to as slick-water fracturing.

In hydraulic fracturing, polyacrylamide based polymers are often used to enhance oil and gas recovery. This fracturing process involves using significant quantities of a fracturing fluid with the main fluid being water that is pumped into an oil and/or gas containing formation under pressure to fracture the rock. Contained within the fracturing fluid is proppant. Generally, the proppant used is sand but could be a variety of other particles. The sand becomes trapped within the fractures and holds them open once pressure is reduced. This allows for improved flow of oil and gas from the formation. Polyacrylamide based polymers are used in the fracturing fluid as friction reducers where the polymer reduces turbulent flow of the fluid. This allows for a reduction in pumping pressure and a potential increase in pump rate. This can greatly reduce the cost of operation and time to complete the hydraulic fracturing process. Other components can also be added to the fracturing fluid to enhance performance of the fluid. For example, the fracturing fluid may include corrosion inhibitors, acids, fluid loss control additives, iron control additives, biocides, surfactants, scale inhibitors, clay control additives, foamers, paraffin inhibitors, gelling agents, pH adjustment additives, buffers, cross-linkers, oxidizing agents, enzymes and gel degrading agents.

It is difficult to add certain scale inhibitors, especially sodium salts of amino phosphate scale inhibitors, into aqueous formulations which have high loadings of active ingredients, for example, non-hydrated water-soluble polymers. These scale inhibitors can result in excessive formulation thickening, batch to batch variability and production of a damaging "goo" within the formulation.

SUMMARY OF THE INVENTION

It is an object of preferred embodiments of the present invention to provide an aqueous formulation which includes a water-soluble polymer and a scale inhibitor which has a low susceptibility to gelling on storage, which does not suffer from excessive slurry thickening and/or "goo" due to the presence of the scale inhibitor and which can be readily mixed with water to produce an advantageous treatment fluid which may, for example, be used as a fracturing fluid and in other uses.

According to a first aspect of the invention, there is provided an aqueous formulation, said formulation comprising:

(i) one or more than one polymer (AA) which is a water-soluble polymer;

(ii) water;

(iii) one or more than one quaternary ammonium compound; and (iv) one or more than one scale inhibitor.

Applicant has found that the inclusion of quaternary ammonium compounds and/or an additional salt (referred to as "salt (BB)" hereinafter) can prevent the hydration of said water-soluble polymer, for example, acrylamido polymers in an aqueous formulation, thus creating a flowable formulation which may not have the problems commonly associated with using invert emulsions, slurries or solid polymer powder. When small concentrations of the formulation are added to large volumes of water, such as a fracturing fluid, the quaternary ammonium compound is substantially diluted, allowing the water-soluble polymer to fully and rapidly hydrate. The ease of hydration renders the formulation useful in numerous applications requiring solutions of water-soluble polymers. In addition, surprisingly, a similar effect is achieved with the scale inhibitor. Rather than exhibiting excessive slurry thickening or a damaging goo when in the formulation described, such disadvantages are avoided, and the aqueous formulation remains flowable. When small concentrations of the formulation are added to large volumes of water, such as a fracturing fluid, the scale inhibitor will gradually dissolve or hydrate which provides long term scale inhibition.

DETAILED DESCRIPTION OF THE INVENTION

In this specification any reference to ppm is to parts per million by weight.

Said formulation preferably includes at least 1 wt %, preferably at least 5 wt %, of said polymer (AA). Said formulation may include less than 60 wt % or less than 50 wt % of said polymer (AA). Said formulation may include 1 to 60 wt %, preferably 5 to 45 wt %, more preferably 14 to 45 wt %, of polymer (AA).

When said formulation includes more than one polymer (AA) the sum of the wt % of all polymers (AA) in said aqueous formulation may be in the range 1 to 60 wt %, preferably in the range 5 to 45 wt %, Said formulation may include at least 5 wt %, preferably at least 10 wt %, of water. Said formulation may include less than 80 wt % or less than 70 wt % of water. Said formulation may include 10 to 70 wt % of water.

Said formulation may include at least 5 wt %, preferably at least 8 wt %, of said quaternary ammonium compound. Said formulation may include 55 wt % or less, preferably 50 wt % or less of said quaternary ammonium compound. Said formulation may include 5 to 50 wt %, preferably 8 to 46 wt %, of said quaternary ammonium compound.

When said formulation includes more than one quaternary ammonium compound, the sum of the wt % of all quaternary ammonium compounds (which preferably are non-polymeric salts, wherein each quaternary ammonium compound includes a cationic moiety) in said formulation is preferably in the range 5 to 50 wt %, more preferably in the range 8 to 45 wt %.

In said formulation, the ratio of the wt % water divided by the wt % of polymer (AA) may be in the range 0.1 to 12.9, preferably in the range 0.2 to 9.2.

When said formulation includes one or more types of polymer (AA), in said formulation, the ratio of the wt % water divided by the wt % of the sum of all types of polymer (AA) may be in the range 0.1 to 12.9, preferably in the range 0.2 to 9.2.

In said formulation, the ratio of the wt % of water divided by the wt % of said quaternary ammonium compound may be in the range 0.1 to 9.0, preferably in the range 0.3 to 6.0.

When said formulation includes one or more types of quaternary ammonium compound, in said formulation, the ratio of the wt % of water divided by the wt % of the sum of all types of quaternary ammonium compounds may be in the range 0.1 to 9.0, preferably in the range 0.3 to 6.0.

In said formulation, the ratio of the wt % of said polymer (AA) divided by the wt % of said quaternary ammonium compound may be in the range 0.15 to 5.5, preferably in the range 0.18 to 4.50.

When said formulation includes one or more types of polymer (AA) and more than one type of quaternary ammonium compound, in said formulation, the ratio of the sum of the wt % of all types of polymer (AA) divided by the wt % of all types of quaternary ammonium compounds may be in the range 0.15 to 5.5, preferably in the range 0.18 to 4.50.

In said formulation, the ratio of the wt % water divided by the wt % of said scale inhibitor may be in the range 0.1 to 100, preferably in the range 0.5 to 80.

In said formulation, the ratio of the wt % of quaternary ammonium compound divided by the wt % of said scale inhibitor may be in the range 0.1 to 100, preferably in the range 0.5 to 45.

In said formulation, the ratio of the wt % of said polymer (AA) divided by the wt % of said scale inhibitor may be in the range 0.1 to 20.0, preferably in the range 0.5 to 20.0

Said formulation preferably includes 5 to 60 wt % (e.g. 10 to 45 wt %) of polymer (AA), 10 to 70 wt % of water and 5 to 50 wt % of said quaternary ammonium compound and 0.1 to 30 wt % (eg 0.5 to 20 wt %) of said scale inhibitor.

Said polymer (AA) may be selected from: a polymer which includes acrylamido repeat units; synthetic polymers formed by condensation reactions; polymers of ethylenically unsaturated monomers; sulfonated resins, water, swellable rubbers; polyethers; polysaccharides (synthetically produced); natural-occurring polymers which may be non-polysaccharides or may be polysaccharides; and polysaccharide derivatives.

Preferred synthetic polymers formed by condensation reactions include polyesters, polyamides, water-swellable polyurethanes and alkylphenol-aldehyde resins.

Preferred polyesters may be formed by condensation of hydroxy acids (e.g. mandelic acid, 12-hydroxystearic acid or another hydroxy fatty acids); or by condensation of a polyol and a di-, tri- or polycarboxylic acid or a precursor thereof (eg an anhydride or acid chloride).

Preferred alkylphenol-aldehyde resins may be formed by condensing C1-100 alkyl or alkenyl substituted phenol with an alkyl or aryl aldehyde having 1-50 carbon atoms. Preferred resins include C5-20 alkyl substituted phenols condensed with formaldehyde or paraformaldehyde.

Preferred polymers of ethylenically unsaturated monomers may include polymers comprising one or more of the following monomers:

(a) Neutral monomers, for example selected from:

Vinyl esters, for example vinyl acetate; vinyl benzoate, vinyl chloroformate or vinyl trifluoroacetate;

Vinyl ethers, for example tert-butyl vinyl ether, 1,4-butanediol vinyl ether or 2-chlorothyl vinyl ether (eg diethylene glycol)vinyl ether, ethylene glycol vinyl ether, methyl vinyl ether, ethyl vinyl ether or propyl vinyl ether);

Vinyl halides;

Styrene derivatives, for example, 2-, 3—, or 4-bromo styrene, chlorostyrene, dichlorostyrene, dibromostyrene, fluorostyrene, methoxystyrene or dimethoxy styrene;

Hydroxyalkyl derivatives of (meth)acrylic acid, for example hydroxymethyl methacrylate or hydroxyethyl methacrylate;

Meth(acrylic) acid esters, for example, benzyl acrylate, butyl acrylate, t-butyl acrylate; diethylene glycol ethyl acrylate, 2-(diethylamino)ethyl acrylate, 3-(dimethylamino)propyl acrylate, ethyl acrylate, propyl acrylate, methyl acrylate; 2-ethylhexyl acrylate; ethyl 2-trimethylsilylmethyl)acrylate; esters with carbohydrates such as 3-O-Acryloyl-1,2:5,6-bis-O-isopropylidene-D-glucofuranose; 6-O-Acryloyl-1,2:3,4-bis-O-(1-methylethylidene)-α-D-galactopyranose or maleimides;

Other monomers, for example ethylvinyl sulfide; n-methyl-n-vinylacetamide, 2-vinyl-1,3-dioxolane; n-vinylphthalimide; allyl alcohol, vinyl alcohol, N-vinyl pyridine; vinyl amine; N-vinyl caprolactone; n-vinyl acetamide, acryoyl morpholine; acrylonitrile; maleic anhydride (mono ester, diester, monoamide, diamide, monoester-monoamide derivatives thereof by condensation with hydrocarbyl amines/hydrocarbyl alcohols); n-vinyl formamide; n-vinyl pyrrolidone; 2-vinyl pyridine, 4-vinyl pyridine, N-vinyl imidazole; 4-acryloylmorpholine (b) Anionic monomers (or monomers neutralised with ammonia, alkali metal, alkaline earth metal), for example selected from:

Monomers with pendant carboxylic acid group (eg a methacrylic acid, acrylic acid, maleic acid, crotonic acid, itaconic acid, 2-carboxyethyl acrylate, fumaric acid or 4-isopropenyl benzoate group);

Monomers with a pendant sulfonate or sulfate group (eg comprising 3-allyloxypropanesulfonate, styrene sulfonate; vinyl sulfonic acid or allyl sulfonic acid);

Monomers with a pendant phosphate group (eg comprising vinyl phosphoric acid or allyl phosphonic acid); Nitrostyrene.

(c) Cationic monomers, for example selected from:

Diallyl dimethyl ammonium chloride (DADMAC), dialkylaminoethyl acrylate (ADAME), dialkylaminoethyl methacrylate (MADAME); acryloyloxyethyltrimethylammonium chloride (MADAM or ADAM), (meth-)acryloyloxyethylbenzyldimethylammonium chloride (MADAMBQ or ADAMBQ); vinylpyridinium chloride, N-vinylimidazoline chloride, vinylbenzyltrimethylammonium chloride; Methacryloyloxyethyltrimethylammonium chloride, Acryloyloxyethyltrimethylammonium chloride, Dimethyldiallylammonium chloride, 1,3-bis(N,N,N-trimethylammonium)-2-propylmethacrylate dichloride or 1,3-bis(N,N,N-trimethylammonium)-2-propylacrylate dichloride.

(d) Amphoteric monomers, for example with pendant betaine or sulfobetaine groups.

Preferred sulfonated resins, water swellable rubbers and polyethers may be selected from: polyalkylene oxides (EO, PO, EO/PO block copolymers), polyethylene glycol, polypropylene glycol or polybutylene glycol.

Preferred polysaccharides may be built using one or more of the following monosaccharides: glucose, dextrose, fructose, levulose, galactose, deoxyribose, glyceraldehyde, erythrose, threose, ribose, arabinose, zylose, lyxose, allose, altrose, mannose, idose, galactose, talose, glycerine, erythrulose, ribulose, xylulose, psciose, robose, tagatose and isomers thereof; or may include monosaccharide derivatives, for example being based on glucosamine or N-acetylglucosamine. Preferred polysaccharides incorporate glucose, galactose, mannose or fructose-derived moieties.

The polysaccharides may be produced by: chemical reaction between one or more monosaccharides, for example using microbial or bacteria based polysaccharide production methods.

Preferred natural-occurring polymers which are non-polysaccharides may be selected from: lecithin, lignin and derivatives (e.g. lignin sulfonate), polylactic acid, polyglycolic acid, polylactide-co-glycolide, poly(3-hydroxypropionic acid), pectin, peptides, polyamino acids especially polyglutamatic acid, polyaspartatic acid, lipids, collagen, enzymes (e.g. cellulase degrading enzymes).

Preferred natural polysaccharides may be selected from: cellulose, guar, diutan, starch, chitin, chitosan, glycogen, xanthan, dextran, dextrin, welan, gellan, pullulan, pectin, scleroglucan, schizophyllan, levan, locust bean gum, peptidoglycan, tara, konjak, tamarind, starch, karaya, tragacanth, carrageenan, glycan, succirioglycan, glucan, scleroglucan, maltodextrin and cyclodextrin.

Polysaccharides may be derivatised to introduce hydrophobic or hydrophilic groups in order to alter the hydrophobic/hydrophilic nature of the polymer; or to add in anionic, cationic or alternative non-ionic functionality (or combinations thereof) onto the polymer backbone.

Polysaccharides may be derivatised by functionalisation of the free hydroxyl (or amino) groups, for example using the following reactions or reagents and/or to produce functional group as described:

Anionic: carboxymethylation (N and O where relevant), phosphate esters, sulfate esters;

Non-ionic: alkoxylation (eg EO, PO, BO); etherification; esterification (with acid anhydrides, acyl chloride, fatty acids), alkylation (eg. with 2-chloro-N,N-diethylamine, 2-chloroethylamine); cross-linking (epichlorohydrin);

Cationic: alkylating with a quaternary ammonium compound (eg 3-chloro-2-hydroxypropyltrimonium chloride or 2,3-epoxypropyltrimethylammonium chloride), quaternisation of existing amine groups (eg chitin);

Graft polymerisation (e.g. with polyacrylamide);

Polysaccharides may be derivatised by functionalisation by reactions on the saccharide skeleton/polymer backbone for example using the following reactions or reagents to produce functional group as described:

Partial oxidisation (with periodate) and then the optional derivatisation of the aldehyde produced to form alcohols (reduction), acids (oxidation), esters, amino functionality (eg via reductive amination);

Graft polymerisation (eg ceric ion initiated) with vinyl compounds (eg (meth)acrylic acids or (meth)acrylate or the like);

Depolymerisation.

In some embodiments, polysaccharides may be enzymatically, physically and/or chemically treated (eg bleach treated or acid treated).

Polysaccharides may have a molecular weight in the range 2000000-5000000 kD and/or may, when functionalised have a degree of functionalisation in the range 5-80%.

Readily commercially-available derivatised polysaccharides may be selected from: starches, guars, celluloses, aminodextran, amino dextrin and amino levan.

Derivatised starches may be selected from: neutral, anionic and cationic derivatives. Examples of neutral derivatives include: hydroxyalkyl starch (eg hydroxyethyl starch or hydroxypropyl starch). Examples of anionic derivatives include: carboxymethyl starch, phosphate starch, hydroxypropyl distarch phosphate, phosphate distarch phosphate and carboxymethyl starch. Examples of cationic derivatives include: hydroxypropyltriemthyl ammonium starch (ie the reaction product with 2-chloro-2-hydroxypropltrimethylammonium chloride and 2,3-epoxypropyltrimethylammonium chloride).

Derivatised guars may be selected from: neutral, anionic and cationic derivatives. Examples of neutral derivatives include: hydroxymethyl guar, hydroxyethyl guar, hydroxypropyl guar (HPG) and guar flakes. Examples of anionic derivatives include: carboxymethyl hydroxypropyl guar (CMHPG), carboxymethyl guar and borate treated guar. Examples of cationic derivatives include: cationic: hydroxypropyltrimethylammonium guar, hydroxypropyl lauryldimethylammonium guar, hydroxypropyl stearyldimethylammonium guar, guar hydroxypropyltrimonium chloride.

Derivatised celluloses may be selected from: neutral, anionic and cationic derivatives. Examples of neutral derivatives include: methyl cellulose, ethyl cellulose, microfibrillated cellulose, nanofibrillated cellulose, hydroxyethyl cellulose (HEC) and hydroxypropyl cellulose (HPC). Examples of anionic derivatives include: cellulose acetate, cellulose acetate butyrate, cellulose acetate propionate, hemi cellulose, carboxymethyl cellulose (CMC), carboxymethylhydroxyethyl cellulose (CMHEC), sulfonated carboxymethylcellulose, sulfonated carboxymethyl-hydroxyethylcellulose, sulfonated hydroxyethylcellulose, sulfonated methylhydroxypropyl-cellulose, sulfonated methylcellulose, sulfonated ethylcellulose, sulfonated propylcellulose, sulfonated ethylcarboxymethylcellulose, sulfonated methylethylcellulose, and sulfonated hydroxyl-propylmethylcellulose. Examples of cationic derivatives include cationic cellulose nanocrystals.

Polyethylene oxide (PEO) is a straight-chained, high molecular weight polymer that functions as a friction reducer. In a preferred embodiment, the weight average molecular weight of the polyethylene oxide is between from about 1 M to about 20 M, more preferably between from about 2 M to about 10 M.

Preferably, said polymer (AA) is a polyacrylamide. Polymer (AA) may be an ionic polyacrylamide, a neutral polyacrylamide or a polyacrylamide wherein an acrylamide moiety has been grafted on to another polymer. In a $referred embodiment, said polymer (AA) is selected from an ionic polyacrylamide (especially an anionic acrylamide) or a neutral polyacrylamide.

When said polymer (AA) is an ionic polyacrylamide, said polymer (AA) may include 0-50 mol %, preferably 5-40 mol %, more preferably 10-30 mol % of ionic repeat units. The balance suitably comprises non-ionic acrylamide repeat units. Whilst polymer (AA) may be an anionic or cationic polyacrylamide, it is preferably an anionic polyacrylamide. Polymer (AA) may be partially hydrolysed acrylamide.

Said polymer (AA) preferably includes a repeat unit which includes an optionally substituted acrylamide, for example an alkylacrylamide (e.g. methacrylamide) or N,N-dialkylacrylamide (e.g. N,N-dimethylacrylamide). An optionally-substituted acrylamide repeat unit of polymer (AA) may be of formula I

I

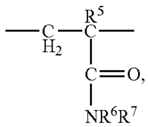

wherein $R^5$, $R^6$ and $R^7$ independently represent a hydrogen atom or an optionally-substituted (preferably unsubstituted) $C_{1-4}$ alkyl, preferably $C_{1-2}$ alkyl, more preferably a methyl group.

In formula I, $R^5$, $R^6$ and $R^7$ preferably represent hydrogen atoms.

On average, the ratio of the number of other repeat units in polymer (AA) divided by the number of repeat units of formula I may be less than 0.6, 0.5, 0.4; 0.3 or 0.2. Said ratio may be at least 0.0025, at least 0.005, at least 0.05 or at least 0.1.

Said polymer (AA) may include (e.g. in combination with repeat unit of formula I) a repeat unit which includes an acrylate or sulfonate moiety, for example an acrylate or sulfonate salt, or a pyrrolidone moiety. Polymers which include sulfonate salts may be preferred when the formulation is used with water which includes high levels of hardness ions, for example magnesium, calcium, strontium, barium or ferrous ions.

Said polymer (AA) may include a repeat unit of formula II which is preferably in combination with a repeat unit of formula I. A repeat unit comprising a moiety of formula II may comprise a moiety:

II

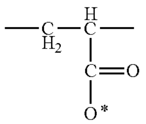

wherein the O* moiety is an $O^-$ moiety or is covalently bonded to another atom or group;

a repeat unit comprising a vinyl pyrrolidone moiety; or a repeat unit comprising a moiety of formula III

III

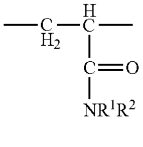

wherein $R^1$ and $R^2$ are independently selected from a hydrogen atom and an optionally-substituted alkyl group. An optionally-substituted alkyl group may define an electrically neutral hydrophobe. An optionally-substituted alkyl group may incorporate an $—SO_3R^3$ moiety wherein $R^3$ is selected from a hydrogen atom and a cationic moiety, for example an alkali metal cation, especially $Na^+$. Said optionally-substituted alkyl group may include 1 to 36, preferably 1 to 20, more preferably 1 to 10 carbon atoms. Said repeat unit may be derived from and/or based on 2-acrylamido-2-methylpropane sulfonic acid, commonly referred to as ATBS or AMPS.

Said polymer (AA) may include a repeat unit comprising a moiety of formula III

III

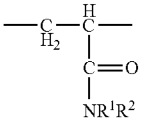

wherein $R^1$ and $R^2$ are independently selected from a hydrogen atom and an optionally-substituted alkyl group, wherein at least one of $R^1$ and $R^2$ includes an alkyl group incorporating an $—SO_3R^3$ moiety wherein $R^3$ is selected from a hydrogen atom and a cationic moiety, for example an alkali metal cation, especially $Na^+$. Said polymer (AA) comprises 100 mol % of repeat units of formula III and is, preferably, polyAMPS.

When polymer (AA) includes anionic repeat units which include sulfonate moieties, preferably, said anionic repeat units are styrene sulfonate or AMPS-based repeat units.

Said polymer (AA) may include acrylamide repeat units in combination with acrylate and/or AMPS-based repeat units.

Said polymer (AA) may include 1-50 mol %, preferably 10-40 mol %, of anionic comonomeric moieties, for example acrylate and/or AMPS-based repeat units.

Polymer (AA) may be derived from one or more of the following monomers:

Cationic monomers—Methacryloyloxyethyltrimethylammonium chloride, Methacrylamidopropyltrimethylammonium chloride, Acryloyloxyethyltrimethylammonium chloride, Dimethyldiallylammonium chloride, 1,3-bis(N,N,N-trimethylammonium)-2-propylmethacrylate dichloride, 1,3-bis(N,N,N trimethylammonium)-2-propylacrylate dichloride.

Anionic monomers—Sodium Acrylate, Sodium 2-Acrylamido-2-methylpropane sulfonate; sodium vinyl sulfonate, sodium methacrylate, methyl methacrylate, 4-vinyl benzylsulfonate, 4-isopropenyl-benzoate, vinyl phosphonate.

Non-ionic Monomers—Acrylamide, Methacrylamide, N,N Dimethylacrylamide, Vinyl pyrolidonone.

Polymer (AA) is preferably derived from the aforementioned anionic monomers and non-anionic monomers.

Polymer (AA) may include monovalent (e.g. $NH_4^+$, quaternary ammonium for example of formula NR4+ where R is optionally-substituted alky or aryl, alkanolamine derived, for example isopropanolamine or triethanolamine derived, $Li^+$, $Na^+$, $K^+$, $Rb^+$ or $Cs^+$), divalent (e.g. $Be^{2+}$, $Mg^{2+}$, $Ca^{2+}$, $Sr^{2+}$, $Ba^{2+}$, $Fe^{2+}$, $Cu^{2+}$ or $Zn^{2+}$) or trivalent (e.g. $Fe^{3+}$ or $Al^{3+}$) cations. It preferably includes monovalent cations, with $Na^+$ being preferred.

Said polymer (AA) preferably includes acrylamide repeat units and acrylate, for example sodium acrylate, repeat units.

In a preferred embodiment, polymer (AA) is selected from acrylamide-acrylate copolymers and acrylamide-acrylate-AMPS terpolymers.

Said polymer (AA) may have a molecular weight of at least 200,000 Daltons. Said molecular weight may be at least 500,000 Daltons, preferably at least 1,000,000 Daltons. The molecular weight may be less than 50,000,000 Daltons or less than 30,000,000 Daltons. Molecular weight, described herein, may be measured by. Measurement of Intrinsic Viscosity (see ISO 1628/1-1984-11-01); and using Intrinsic Viscosity/Molecular Weight Correlation via the Mark-Houwink Equation). Said molecular weight may be in the range 15,000,000-20,000,000 Daltons.

Polymer (AA) is preferably dispersed in said aqueous formulation, suitably as solid discrete particles. The particles may be in the form of powder, granules or flake. Unless otherwise stated, particles sizes are measured using a Beckman Coulter Laser Particle Size Analyser LS13320. Said particles preferably have a mean particle diameter of at least 100 μm, at least 200 μm or at least 300 μm. Said mean particle diameter may be less than 1000 μm, for example less than 700 μm or less than 500 μm. At least 90 wt %, preferably at least 98 wt %, more preferably about 100 wt % of said particles of said polymer (AA) have a diameter greater than 1 μm, greater than 10 μm or greater than 20 μm. Said particles of said polymer (AA) suitably have a diameter less than 2000 μm, or less than 1100 μm. Said particles of said polymer (AA) may include less than 15 wt %, preferably less than 5 wt % water.

The particle sizes of the polymer used may have multi-modal for example bimodal or tri-modal particle distributions so that hydration rates may be adjusted according to the requirement of the application, for example to match pipe residence times during the fracturing process. Smaller sized particles would be selected for applications where there are short residence times. Bimodal particle distributions comprising small particles that rapidly hydrate and larger particles that take longer to hydrate may be used in applications where there are long residence times, for example fracturing in extended well-bores.

Said quaternary ammonium compound may be a mono quaternary ammonium compound, a bisquaternary ammonium compound or a polymeric quaternary ammonium compound. A mono quaternary ammonium compound may be a choline, a tetraalkylammonium compound; or a cyclic quaternary ammonium compound, for example a pyridinium compound as described in U.S. Pat. Nos. 2,761,840, 5,197,544 and 5,097,904. A bisquaternary ammonium compound may be of the formula [X]Q-L-QX]; wherein X is an anion, Q is a quaternary ammonium group (which may be a tetraalkyl or cyclic group) and L is a linking group (for example alkyl, 2-hydroxy propyl or aryl) as described in U.S. Pat. No. 3,349,032 and US20040275677. Examples of polymeric quaternary ammonium compounds include (co) polymers of quaternised amino ethyl methacrylates for example those taught in U.S. Pat. No. 4,366,074 and polymers of maleic anhydride derivatives for example those taught in U.S. Pat. Nos. 5,160,642 and 7,601,675. A polymeric quaternary ammonium compound may also be a (co)polymer of quaternised amino ethyl methacrylates as described in U.S. Pat. No. 4,366,074 or a polymer of maleic anhydride derivatives as described in U.S. Pat. Nos. 5,160,642 and 7,601,675.

Said quaternary ammonium compound may be selected from a mono quaternary ammonium compound, a bisquaternary ammonium compound a polymeric quaternary ammonium compound, or combinations thereof.

Said quaternary ammonium compound is preferably a salt. It suitably includes a quaternary ammonium cation and an anionic moiety. Said anionic moiety may be selected from a halide, for example fluoride, chloride, bromide or iodide; salicylate; oxalate; bicarbonate; bitartarate; citrate; carbonate; dihydrogen citrate; nitrate; nitrite; phosphate; sulfate; sulfonate. Said anionic moiety is preferably selected from a halide, for example, chloride.

Said quaternary ammonium compound may be prepared using a quaternising agent. Suitable quaternising agents are known to one skilled in the art of preparing quaternary ammonium compounds and are taught for example in US20200361891 and WO2015011505. Preferred quaternising agents include: alkyl or alkenyl esters of carboxylic acids: including α-hydroxy esters, especially methyl salicylate and mono- or di- or tri-esters of citric acid; esters of polycarboxylic acids, especially dimethyl oxalate; benzyl halides including benzyl chloride and benzyl bromide, alkyl halides especially methyl chloride, methyl bromide and methyl iodide; dialkyl sulfates, especially dimethyl sulfate; epoxide quaternising agents for example ethylene oxide, propylene oxide and styrene oxide, optionally in combination with an additional acid; alkyl nitrobenzoate esters, especially methyl 2-nitrobenzoate or methyl 3-nitrobenzoate; alkyl carbonates including dimethyl carbonate; alkyl nitrates; alkyl nitrites; halohydrins especially 2-chloroethanol; or sodium chloroacetate.

An ion exchange reaction may be used to change said anionic moiety. For example, the quaternary ammonium compound may be prepared using an alkyl halide or benzyl halide and subjected to an ion exchange reaction to provide a different anion as part of the quaternary ammonium compound. Such a method may be suitable to prepare quaternary ammonium compounds wherein the anionic moiety is a hydroxide, alkoxide, nitrite or nitrate.

Said quaternary ammonium compound may include a moiety (XI)

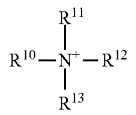

wherein $R^{10}$, $R^{11}$, $R^{12}$ and $R^{13}$ is each individually an optionally substituted alkyl, alkenyl or aryl group; or two of groups $R^{10}$, $R^{11}$, $R^{12}$ and $R^{13}$ may together define a cyclic structure.

In this specification, unless otherwise stated in the context of said quaternary ammonium compound, references to optionally substituted alkyl groups may include aryl-substituted alkyl groups and references to optionally-substituted aryl groups may include alkyl-substituted or alkenyl-substituted aryl groups. Preferred aryl substituted alkyl groups are benzyl groups.

Said moiety of formula (X) may include a single quaternary ammonium moiety or may include two quaternary ammonium moieties and may, for example, be a diquaternary ammonium moiety. Preferably, said moiety of formula (X) includes a single quaternary ammonium moiety and/or a single nitrogen atom.

$R^{10}$, $R^{11}$, $R^{12}$ and $R^{13}$ may be independently selected from hydroxyalkyl groups, especially hydroxymethyl, 1-hydroxyethyl, 2-hydroxyethyl, 2-hydroxypropyl, 3-hydroxypropyl, benzyl and $C_{1-25}$, preferably $C_{1-10}$ hydrocarbyl groups, especially methyl, ethyl, propyl, isopropyl and butyl.

Preferably, $R^{10}$, $R^{11}$, $R^{12}$ and $R^{13}$ represent optionally-substituted alkyl groups. Preferred alkyl groups are $C_{1-4}$ alkyl groups. Preferably, $R^{10}$, $R^{11}$ and $R^{12}$ each represent an unsubstituted $C_{1-4}$ alkyl group.

Preferably, each of $R^{10}$, $R^{11}$ and $R^{12}$ represents the same, unsubstituted, alkyl group. $R^{10}$, $R^{11}$ and $R^{12}$ preferably each represent a $C_{1-3}$ alkyl group. In a preferred embodiment, $R^{10}$, $R^{11}$ and $R^{12}$ each represent methyl groups.

In a preferred embodiment, $R^{13}$ represents a group $—(CH_2)_m X$ wherein m is an integer, preferably in the range 1 to 4 and X represents a hydrogen atom or a polar moiety. Said polar moiety may be selected from —OH, $—SO_3H$.

Preferably, a cation of said quaternary ammonium compound is selected from choline, tetramethylammonium, tetraethylammonium, tetrapropylammonium, tetrabutylammonium and imidazolinium; and an anion of said quaternary ammonium compound is selected from chloride, bromide and iodide. Said quaternary ammonium compound may be selected from choline chloride, tetramethyl ammonium chloride, tetraethylammonium chloride and tetrapropyl ammonium chloride. Preferably, said quaternary ammonium compound is a tetraalkylammonium compound.

In an embodiment, the formulation preferably comprises at least 0.1 wt % of a scale inhibitor. The formulation may comprise less than 50 wt %, preferably less than 40 wt %, of scale inhibitor. The formulation may comprise 0.1 to 50 wt %, preferably 0.15 to 40 wt %, especially 0.2 to 30 wt % of scale inhibitor.

Said scale inhibitor preferably includes a moiety (XX)

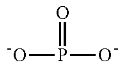

Said scale inhibitor preferably includes multiple (e.g. at least 2 (which encompasses HEDP), 3, 4 or 5) moieties of formula (XX) per molecule of scale inhibitor.

Said scale inhibitor is preferably an organic molecule which includes said one or more moieties (XX). For example, said scale inhibitor may include one or more saturated $—CH_2—$ containing chains, for example of formula $—(CH_2)n-$ wherein n is at least 2 and may be less than 10.

Said scale inhibitor preferably includes one or more (preferably at least 2 or at least 3) amino moieties, for example tertiary amino moieties.

Said scale inhibitor is preferably a salt and, more preferably, includes a calcium or magnesium salt. Said scale inhibitor may include a mixture of calcium and magnesium salts, optionally with sodium or ammonium ions. Said scale inhibitor is preferably a magnesium salt. For example, said moiety of formula (XX) may comprise a counter-ion, to define a salt form, wherein said counter-ion is a calcium or magnesium ion. Said counter-ion is preferably a magnesium ion. Thus, said moiety of formula (XX) preferably includes a moiety of formula (XXI)

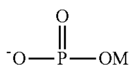

wherein M represents a calcium or, especially, a magnesium ion.

Said scale inhibitor may include phosphate moieties or amino phosphonate moieties of formula $N—(CH_2)n-PO_3M$, where n is an integer in the range 1 to 6, preferably in the range 1 to 4 and M is as described above.

Said scale inhibitor may be a salt (eg a calcium or, especially, a magnesium salt) of amino phosphonic acids selected from: aminomethyl phosphonic acid, 1-aminoethyl phosphonic acid, iminodi(methylphosphonic acid), nitrilotri (methyl phosphonic acid)glyphosate, 1-aminopropylphosphonic acid, ethylenediamine tetra(methylene phosphonic acid) [EDTMP], N-(Phosphonomethyl)iminodiacetic acid, (nicotinamidomethyl)phosphonic acid, amino(phenyl)methylphosphonic acid, 1-hydroxyethylidene-1,1-diphosphonic acid (editronic acid or HEDP), Diethylenetriamine penta (methylene phosphonic acid) (DTPMP), bis(hexamethylene triamine penta(methylenephosphonic acid)) (BHMP), AEEA phosphonate [Aminoethylethanolamine tri(methylene phosphonate)], 2-(bis(phosphonomethyl)amino)alkane-1-sulfonic acid, N,N-bis(phosphonomethyl)glycine, N,N-bis (phosphonomethyl) metanilic acid, (1-Amino-2-methylpropyl)phosphonic acid.

Examples of phosphates includes adenosine monophosphate (AMP), adenosine triphosphate (ATP), C1-10 alkyl phosphates, aryl phosphates, alkyaryl phosphates, 2-Aminoethyl dihydrogen phosphate, glycerol phosphate.

Said scale inhibitor may be selected from: alkaline earth metal salts of: 1-hydroxyethylidene-1,1-diphosphonic acid (editronic acid or HEDP), adenosine monophosphate (AMP), adenosine triphosphate (ATP), ethylenediamine tetra(methylene phosphonic acid) [EDTMP], Diethylenetriamine penta(methylene phosphonic acid) (DTPMP), bis (hexamethylene triamine penta(methylenephosphonic acid)) (BHMP), AEEA phosphonate [Aminoethylethanolamine tri (methylene phosphonate)]; and polymeric scale inhibitors, for example, polyacrylate, polymethacrylate, polyphosphino carboxylic acid salts, salts of maleic anhydride polymers and copolymers, copolymers of allyl sulfonates with acrylates and or maleic acid, acrylate-2-acrylamido-2-methylpropane sulfonic acid copolymers, polyaspartic acid; and including salts, co-polymers and ter-polymers of, or including, any of the aforesaid.

Said scale inhibitor may be a calcium or magnesium (especially a magnesium) salt of any of the preceding scale inhibitors.

In a preferred embodiment, said scale inhibitor includes a moiety XX, is an acrylate-based polymer, is a phosphonate-based polymer and/or includes a $SO_3-$ moiety.

Said scale inhibitor may be a calcium or magnesium (especially a magnesium) salt of a phosphonic acid, for example a salt of an amine (e.g. a triamine) phosphonic acid and/or a salt of a triamine pentamethylene phosphonic acid. Specific examples include salt of diethylene triamine pentamethylene phosphonic acids (DETA-based scale inhibitors) and bis-hexamethylene triamine pentamethylene phosphonic acids (BHMP-based scale inhibitors).

Scale inhibitors which include a moiety XX may be prepared by adding a source of $Mg^{2+}$, for example MgO or $MgCl_2$, into a solution of a scale inhibitor which includes a moiety XX until the magnesium salt precipitates. The skilled person will appreciate that commercially available MgO and $MgCl_2$ may not be pure and may comprise minor amounts of other salts for example calcium salts and, therefore, the scale inhibitor salt produced may contain a minor amount of calcium cations.

In some embodiments a molar ratio of Mg to scale inhibitor is from 0.1:1 to 10:1, preferably 1:1 to 5:1. In a preferred embodiments where the source of $Mg^{2+}$ is $MgCl_2$ and the scale inhibitor is bis-hexamethylene triamine pentamethylene phosphonic acids the molar ratio of $MgCl_2$:BHMP is from 3:1 to 5:1.

Scale inhibitors may also be prepared as described in U.S. Pat. No. 7,081,212.

Preferred polymeric scale inhibitors may be selected from sodium polyacrylate, potassium salts of maleic acid copolymers, polyphosphates and copolymers of acrylate and 2-acrylamido-2-methylpropane sulfonic acid and salts thereof.

Said aqueous formulation preferably includes a salt (BB) in addition to components (i), (ii), and (iii). Said salt (BB) is suitably not a quaternary ammonium compound. In the formulation, the salt (BB) may act as a specific density modifier which facilitates the suspension of the polymer (AA). Alternatively and/or additionally, salt (BB) may help to improve stability and flowability of the formulation after extended storage and/or when exposed to elevated temperatures.

Said formulation suitably includes at least 2 wt %, preferably at least 10 wt. Said formulation may include less than 50 wt % of said salt. Said formulation may include 2 to 40 wt %, preferably 5 to 35 wt %, of said salt (BB).

Said salt (BB) may be an alkali or alkaline earth metal salt. Alkali metal salts includes sodium halides especially sodium chloride and potassium chloride, alkali metal hydroxides including sodium hydroxide and potassium hydroxide. It is preferably an alkaline earth metal salt, with calcium and magnesium salts being preferred. Calcium is especially preferred. The counter-ion may be selected from monovalent anions, for example from hydroxide, acetate, formate, halide, nitrate, nitrite, sulfonate (eg taurate) and isethionate or divalent anions, for example oxide [$O^{2-}$]. Preferred counter-ions are halides, with chloride being especially preferred. Salt (BB) is preferably selected from calcium chloride and magnesium chloride and mixtures thereof.

Salt (BB) may be a salt or hydrate of a salt.

When said formulation includes more than one salt (BB), the sum of the wt % of all salts (BB) is suitably at least 2 wt %, preferably at least 10 wt %. In said formulation the sum of the wt % of each salt (BB) may be less than 50 wt %. Said formulation may include 2 to 40 wt % in total of salts (BB), preferably 5 to 35 wt %, in total of salts (BB).

The sum of the wt % of said quaternary ammonium compound, said salt (BB) and said scale inhibitor is preferably at least 10 wt %. Said sum may be less than 70 wt %. Said sum may be in the range 10 to 70 wt %.

In said formulation, the ratio of the wt % of water divided by the wt % of said salt (BB) may be at least 0.6. Said ratio may be less than 8.0.

In said formulation, the ratio of the wt % of water divided by the sum of the wt % of said quaternary ammonium compound and said salt (BB) may be at least 0.2, preferably at least 0.5. Said ratio may be less than 5.0, preferably less than 4.0.

Preferably, in said formulation the sum of the wt % of each polymer (AA), water, each quaternary ammonium compound, each salt (BB) and each scale inhibitor is at least 90 wt %, preferably at least 95 wt %, more preferably at least 97 wt %.

Preferably, in said formulation the sum of the wt % of a polymer (AA), water, a quaternary ammonium compound, a salt (BB) and a scale inhibitor is at least 90 wt %, preferably at least 95 wt %, more preferably at least 97 wt %.

Said formulation optionally may include water miscible solvents, at up to 5 wt %, such as lower alkanols, especially methanol, ethanol, isopropanol and glycols such as ethylene glycol. The amount may be selected based on the salt content of the formulation to prevent the salt from being precipitated out.

Said formulation may include a suspending agent. Said formulation may include 0-5 wt %, preferably 0-1 wt %, of said suspending agent which may be a clay suspending agent which, preferably, is selected from attapulgite, laponite and derivatives thereof; or a polymeric suspending agent, especially a polysaccharide suspending agent such as Diutan. In another embodiment the formulation may include 0.1-5 wt % of said suspending agent.

Said formulation may have a suspension viscosity measured on a Brookfield LVT machine with LV spindle at 30 rpm and at 20° C. (68° F.) of 1000-15000 cP. Said formulation may have an apparent density in the range 1.05-1.48 g/l.

Suitably, formulations described are stable and do not gel. Preferably, they are not a gel and do not gel over time. More preferably the formulations do not gel when exposed to elevated temperatures for example 120° F. (48.9° C.) for extended periods of time, for example 24 hours. The skilled person would be able to determine that the formulations do not gel by visual inspection to confirm the formulations remain uniform or homogenous and are pourable from their storage containers at room temperature (e.g., 22° C.).

A preferred aqueous formulation comprises:

5-50 wt %, preferably 10-30 wt %, of a polymer (AA) which includes acrylamido repeat units;

water, suitably 20 to 40 wt % water 10-50 wt % of a quaternary ammonium compound, preferably a choline salt; and 10-30 wt % of a calcium or magnesium halide, preferably calcium chloride; and 0.1-20 wt % of scale inhibitor.

The formulation may include other additives, selected from corrosion inhibitors, proppant particulates, acids, fluid loss control additives, biocides, surfactants, clay control additives, foamers optionally accompanied with gasses such as air, natural gas, $N_2$ or $CO_2$ to form a foam, paraffin inhibitors, gelling agents, pH adjustment additives, buffers, cross-linkers, oxidizing agents, enzymes and gel degrading agents.

The aqueous formulation may made in methods known to those skilled in the art. In one embodiment the aqueous formulation is made by adding the scale inhibitor and polymer (AA) to the water, quaternary ammonium compound and optionally salt (BB). The scale inhibitor and polymer may be added in any order or at the same time. In another embodiment, suitable for when the scale inhibitor is an aqueous solution, the quaternary ammonium compound and salt (BB) may be added to the solution of scale inhibitor, followed by polymer (AA).

According to a second aspect, there is provided a method of preparing a treatment fluid, the method comprising:

(a) selecting an aqueous formulation according to the first aspect; and (b) contacting the aqueous formulation with water.

Preferably, said treatment fluid comprises 0.4-15 lb polymer (AA) per 1000 gal of treatment fluid and more preferably includes 0.75-10 lbs polymer (AA) per 1000 gal fluid of treatment fluid.

Any reference to Gallons herein refers to US Gallons.

The fluid may be a fracturing fluid. As a result of the contact and/or mixing of said aqueous formulation with water, the polymer (AA) mixes with and/or is solubilised by the water. When the treatment fluid is a fracturing fluid, polymer (AA) is preferably an acrylamido (co)polymer. The fracturing fluid so formed exhibits a lower friction in use compared to that of water and/or such lower friction may be achieved rapidly on contact between formulation (A) and water. In addition, after contact, the scale inhibitor hydrates and dissolves.

Water which is mixed with said aqueous formulation may be derived from any convenient source. It may be potable water, surface water, sea water, brine, flow-back water, aquifer water or produced water. References herein to amounts of water, particularly in the context of water which forms a major part of a fracturing fluid described, suitably refer to water inclusive of components present in the source of water, such as dissolved salts found in sea water.

The method may comprise making a fracturing fluid which includes 25 to 10,000 ppm, 250 to 6,300 ppm, 440 to 3,800 ppm or 630 to 1,900 ppm of said aqueous formulation in water.

In the method, other additives may be contacted with said aqueous formulation after and/or concurrently with water. Said other additives may be selected from corrosion inhibitors, proppant particulates, acids, fluid loss control additives, biocides, surfactants, clay control additives, foamers optionally accompanied with gasses such as air, natural gas, $N_2$ or $CO_2$ to form a foam, paraffin inhibitors, gelling agents, pH adjustment additives, buffers, cross-linkers, oxidizing agents, enzymes and gel degrading agents.

Preferably, at some stage in the method, one or a plurality of proppants is incorporated into the fracturing fluid. The proppant may have a size of at least 140 US Mesh; it may have a size of less than 5 US Mesh. The proppant may be selected from sand, bauxite, and man-made intermediate or high strength materials. A preferred proppant is 100 mesh sand. The proppant is arranged to restrict close down of a fracture on removal of hydraulic pressure which caused the fracture.

Preferably, at some stage in the method, said fracturing fluid includes 2.9 to 54 wt %, for example 5 to 40 wt %, of proppants.

According to a third aspect, there is provided a treatment fluid, optionally prepared as described in accordance with the second aspect, the treatment fluid comprising:

(i) one or more than one polymer (AA) which is a water-soluble polymer;

(ii) water;

(iii) one or more than one quaternary ammonium compound; and (iv) one or more than one scale inhibitor.

Preferably, said treatment fluid comprises 0.4-15 lb (48-1,800 ppm) polymer (AA) per 1000 gal of treatment fluid and more preferably includes 0.75-10 lbs (90-1,200 ppm) polymer (AA) per 1000 gal fluid of treatment fluid.

Preferably, said treatment fluid comprises 0.1-301b of said quaternary ammonium per 1000 gal of said treatment fluid, for example 12-3,600 ppm of said quaternary ammonium based on the parts by weight of said treatment fluid.

Preferably, said treatment fluid comprises 1-1000 ppm, preferably 1-250 ppm, of said scale inhibitor based on the parts by weight of said treatment fluid.

The fluid may be a fracturing fluid.

According to a fourth aspect, there is provided a method of treatment which comprises:

(A) selecting a treatment fluid according to the third aspect;

(B) contacting an area to be treated with said treatment fluid.

Said treatment may be selected from: slick water fracturing, water treatment, enhanced oil recovery, drilling, erosion control, dust abatement and mining flotation operations. Said treatment is preferably a slick water fracturing treatment.

According to a fifth aspect of the invention, there is provided the use of an aqueous formulation of the first aspect for preparing a treatment formulation of the third aspect and/or for use in the method of the fourth aspect.

According to a sixth aspect, there is provided the use of a treatment formulation for slick water fracturing, water treatment, enhanced oil recovery, drilling, erosion control, dust abatement and mining flotation operations. Said treatment is preferably a slick water fracturing treatment. Said use is preferably for slick water fracturing.

According to a seventh aspect of the invention, there is provided an assembly positioned adjacent to a well communicating with a subterranean formation, said assembly being arranged to deliver a treatment fluid, for example a fracturing fluid into the formation, said assembly comprising:

(I) a receptacle containing an aqueous formulation according to the first aspect;

(II) a water supply;

(III) a pump (PI) and optional flow meter for dosing aqueous formulation from said receptacle into said water supply, suitably to define at least part of a fracturing fluid;

(IV) a conduit for delivering fracturing fluid into the formation; and (V) a pump (P2) for injecting the fracturing fluid via said conduit into the formation.

According to an eighth aspect of the invention, there is provided a method of making a formulation according to the first aspect, the method comprising:

(i) selecting a scale inhibitor precursor which includes a moiety (XX) but is not in the form of a calcium or magnesium salt; and (ii) contacting the scale inhibitor precursor with a calcium and/or magnesium salt to produce a calcium and/or magnesium salt of the scale inhibitor precursor respectively.

The method may include preparation of a slurry comprising solid scale inhibitor (suitably the calcium or magnesium, especially the magnesium, salt of said scale inhibitor precursor).

The method preferably includes incorporation of the other ingredients of the aqueous formulation of said first aspect either before or after step (ii).

In a preferred embodiment, step (ii) involves contact with a magnesium salt, for example a magnesium chloride (e.g. the hexahydrate). Suitably, the ratio, defined as the weight of said scale inhibitor precursor (e.g. a DETA-based inhibitor or a BHMP-based inhibitor) divided by the weight of said magnesium salt (e.g. magnesium chloride hexahydrate) is in the range 1:0.25 to 1:0.45

Any aspect of any invention described herein may be combined with any feature described in any other aspect of any invention or embodiment described herein mutatis mutandis.

SPECIFIC EMBODIMENTS OF THE INVENTION

Specific embodiments of the invention will now be described, by way of example.

The following materials are referred to hereinafter:

Choline Chloride solution (quaternary ammonium compound)—a commercially available solution containing 70-75 wt % active.

Floragel HY—A commercially available attapulgite based clay suspending agent.

Friction reducer Polymer (I)—refers to partially-hydrolyzed polyacrylamide (PHPA) including 25-30% acrylate units, with molecular weight 10-25 million Da.

Friction reducer Polymer (II)—refers to AMPS-acrylamide copolymer including 10% mol % AMPS, with molecular weight about 8-12 million Da and an overall ionic charge of 30%.

BHIMP sodium salt—refers to a commercially available solution of bis-hexamethylene triamine pentamethylene phosphonic acid sodium salt with 30-50 wt % active (a BHMP-based inhibitor).

BHMP magnesium salt—refers to a commercially available bis-hexamethylene triamine pentamethylene phosphonic acid magnesium salt (a BHMP-based inhibitor)

Scaletreat 12772—an aqueous solution of potassium maleic acid copolymer including 50-70 wt % active.

Kemguard 5264—a sodium acylate-AMPs copolymer including less than 46 wt % active.

Kemguard 5040 LS—a sodium polyacrylate including about 35 wt % active.

Kemguard 2593—a polycarboxylic acid/polysulphonate including 42-60 wt % active obtained from Kemira.

Kemguard 5042—a sodium polyacrylate including less than 54 wt % active.

ASP 529—solid polyphosphate particles including 100 wt % active.

Flosperse—TS 3000 a sodium polyacrylate including 100 wt % active.

Flosperse TS 1000-TS 3000 a sodium polyacrylate including 100 wt % active.

Example 1 (Comparative)

A formulation was prepared by mixing the following ingredients.

| Component | Amount wt % |
|---|---|
| Tap water | 22.72 |
| Choline Chloride solution | 21.22 |
| Floragel | 0.46 |
| 50% caustic (NaOH) | 1.44 |
| Magnesium chloride hexahydrate | 1.79 |
| Calcium chloride | 22.37 |
| Friction reducer polymer II | 20.00 |
| BHMP sodium salt (scale inhibitor) | 10 |

It was found that the formulation gelled and/or formed a "goo" which rendered it unusable as a friction reducer formulation.

Examples 2 to 4—Preparation of Scale Inhibitor-Containing Slurries

Example 2

A slurry of a Mg-BHMP scale inhibitor was first prepared by mixing the ingredients detailed below.

| Component | Amount (% by wt) | Amount (lb) (~10 gal) |
|---|---|---|
| Water | 9.6 | 9.14 |
| Choline chloride | 28.8 | 27.42 |
| BHMP sodium salt (scale inhibitor) | 38.4 | 36.56 |
| Magnesium chloride hexahydrate | 15.5 | 14.76 |
| 50% Caustic (NaOH) # | 7.7 | 7.33 |

- Final pH was between 8.0 and 8.5.

Example 3

An aqueous polymer slurry was prepared by mixing the ingredients detailed below.

| Component | Amount (wt %) |
|---|---|
| Water | 26.0 |
| Choline Chloride (70-75%) | 24.3 |
| Florigel HY | 0.5 |
| 50% NaOH | 1.6 |
| Magnesium chloride hexahydrate | 2.1 |
| $CaCl_2$ | 25.6 |
| Friction reducer polymer (II) | 20.0 |

Example 4

A scale inhibitor-containing polymer slurry was prepared by mixing, with good agitation until uniform, slurries prepared as described in Examples 2 and 3 in the amounts as per the table below:

| Component | Amount (% by wt) | Amount (Assuming 320 gal in a Tote) (lb [gal]) |
|---|---|---|
| Example 3 formulation | 97.4 | 3553 lb [310 gal] |
| Example 2 formulation | 2.61 | 95.2 lb [9.93 gal] |

It was found that the scale inhibitor of Example 4 remained highly fluid and could be used as a friction reducer formulation in contrast to the formulation of Example 1. It is believed this is due to formation of a magnesium salt of the scale inhibitor by virtue of the inclusion of magnesium chloride hexahydrate.

Examples 5 to 7

A scale inhibitor-containing polymer slurry can also be made by adding a magnesium salt formed by treating BHMP sodium salt to a carrier fluid followed by polymer addition as detailed below.

Example 5

A scale inhibitor formulation was prepared by mixing the ingredients detailed in the table below:

| Component | Amount wt % |
|---|---|
| Water | 38.4 |
| BHMP sodium salt | 38.4 |
| $MgCl_2$ $6H_2O$ | 15.5 |
| 50% aq NaOH | 7.7 |

Example 6

A carrier fluid was prepared having the following formulation:

| Component | Amount (wt %) |
|---|---|
| Water | 32.45 |
| Choline Chloride (70-75%) | 30.31 |
| Florigel HY | 0.66 |
| 50% NaOH | 2.05 |
| $MgCl_2$ $6H_2O$ | 2.57 |
| $CaCl_2$ | 31.95 |

The carrier fluid may be used for friction reducer slurries containing a "high" active friction reducer content product (eg 39 wt % of friction reducer polymer) or a low active friction reducer content product (eg 20 wt % or lower of friction reducer polymer).

Example 7

A scale inhibitor-containing polymer slurry was prepared by mixing the formulations of Examples 5 and 6 as follows:

| Component | Amount (wt %) |
|---|---|
| Example 5 slurry | 2.61 |
| Example 6 formulation | 77.39 |
| Friction Reducer polymer (II) | 20 |

The above exemplifies a low active friction reducer content product.

Example 8—Stability Testing

Slurries described in selected Examples were placed in a forced air oven at constant temperatures of 120° F. for defined storage periods and the formulation passed if it was still flowable and had not gelled by the end of the period

Example 9—General Procedure for Flow-Loop Testing of Formulations

A flow loop device is used to examine friction reduction as a function of time. Not having maximal friction reduction and/or rapid dissolution times can mean a loss in polymer performance that could impact the cost and time of a hydraulic fracturing operation. Low polymer performance can also impact oil well production if proppant carrying and placement in the formation is impacted. The flow loop used was composed of two 10 ft pipes in sequence, one ¾ inch and the other ½ inch. The water used came from tap water and was held in a 5 gallon reservoir tank, equipped with an overhead stirrer. The fluid was recirculated through the pipes and reservoir using a Moyno 5 pump. The flow rate in each test was held constant at 10 gal/min. Initially, Test water was pumped for two minutes at constant rate to establish a baseline. After two minutes, a friction reducer to be tested was added to the reservoir tank with 30 seconds of vigorous mixing to assure uniform distribution of friction reducer while also flowing through the flow loop plumbing. The pressure drop across the length of each pipe, the flow rate through each pipe and the fluid temperature was continuously recorded, with data being collected at a rate of one data point per second. At the completion of each test, the flow rate, temperature and the percent friction reduction (calculated as 1—(Δ P FR/Δ P water), were plotted against time.

Examples 3 and 11 (Comparative) Assessment of Formulation by Example 12

The formulation of example 4 was assessed as described in examples 8 and 9 and compared to an equivalent formulation that does not contain the scale inhibitor (Example 3) and a commercially available solid acrylamide terpolymer (Example 11). Results are provided below.

| Example No. | Time to maximum friction reduction (seconds) | Maximum friction reduction (%) |
|---|---|---|
| 12 | 27 | 69.5 |
| Example 3 (comparative) | 26 | 70.2 |
| 11 (comparative) | 26 | 70.2 |

In addition, the formulation of example 4 was found to be flowable (i.e. it did not gel) during treatment as described in example 8 at 120° F. over 6 days.

Examples 12 to 24—Preparation of Polymer Slurries for Testing

Into a beaker equipped with temperature probe and stirrer, there was charged tap water. Suspending agent was added followed by the alkali and alkaline salts and choline chloride solution and the mixture was stirred at high shear at ambient temperature. Then friction reducer polymer was added in slowly and the mixture was mixed for 15 minutes and then finally the scale inhibitor was added to give the final slurry.

The formulations detailed in the tables below were prepared and tested as described in example 8. In the tables, the % stated is the % by weight (wt %).

| Example No. | 12 | 13 | 14 | 15 | 16 | 17 | 18 |
|---|---|---|---|---|---|---|---|
| Tap water | 25.7% | 22.1% | 22.7% | 22.7% | 2.8% | 22.7% | 22.7% |
| Choline Chloride | 24.0% | 20.6% | 21.2% | 21.2% | 59.0% | 21.2% | 21.2% |
| Floragel | 0.5% | 0.5% | 0.5% | 0.5% | 0.5% | 0.5% | 0.5% |
| NaOH | 1.6% | 1.4% | 1.4% | 1.4% | 0.6% | 1.4% | 1.4% |
| MgCl2 6H2O | 2.0% | 1.7% | 1.8% | 1.8% | 0.8% | 1.8% | 1.8% |
| CaCl2 | 25.3% | 21.7% | 22.4% | 22.4% | 11.3% | 22.4% | 22.4% |

-continued

| | | | | | | | |
|---|---|---|---|---|---|---|---|
| Friction reducing polymer (II) | 19.8% | 30.0% | 20.0% | 20.0% | 20.0% | 10.0% | 15.0% |
| BHMP magnesium salt | 1.0% | 2.0% | 10.0% | — | 5.0% | 2.0% | 5.0% |
| Nalco ASP529 | — | — | — | 10% | — | — | — |
| FLOSPERSE ™ TS 1000/3000 | — | — | — | — | — | 18.0% | 10.0% |
| Scale treat 12772 | | | | | | | |
| Copolymer Sodium acrylate-AMPs copolymer | — | — | — | — | — | — | — |
| Kemguard 5264 | — | — | — | — | — | — | — |
| Kemguard 5042 | — | — | — | — | — | — | — |
| Sodium polyacrylate Kemguard 5040 LS | | | | | | | |
| Stability result | 120 F. 2 weeks | 120 F. 2 weeks | 120 F. 2 weeks | 120 F. 2 weeks | 120 F. 2 weeks | 120 F. 2 weeks | 120 F. 2 weeks |

| Example No. | 19 | 20 | 21 | 22 | 23 | 24 |
|---|---|---|---|---|---|---|
| Tap water | 22.7% | 24.3% | 24.3% | 24.3% | 24.3% | 24.3% |
| Choline Chloride | 21.2% | 22.7% | 22.7% | 22.7% | 22.7% | 22.7% |
| Floragel | 0.5% | 0.5% | 0.5% | 0.5% | 0.5% | 0.5% |
| NaOH | 1.4% | 1.5% | 1.5% | 1.5% | 1.5% | 1.5% |
| MgCl2 6H2O | 1.8% | 1.9% | 1.9% | 1.9% | 1.9% | 1.9% |
| CaCl2 | 22.4% | 24.0% | 24.0% | 24.0% | 24.0% | 24.0% |
| Friction reducing polymer (II) | 10.0% | 20.0% | 20.0% | 20.0% | 20.0% | 20.0% |
| BHMP magnesium salt | — | — | — | — | — | — |
| Nalco ASP529 | — | — | — | — | — | — |
| FLOSPERSE ™ TS 1000/3000 | 20.0% | — | — | — | — | — |
| Scale treat 12772 | | 5.0% | | | | |
| Copolymer Sodium acrylate-AMPs copolymer | — | | 5.0% | — | — | — |
| Kemguard 5264 | — | — | | 5.0% | — | — |
| Polymeric SI Kemguard 5042 | — | — | — | — | 5.0% | — |
| Sodium polyacrylate Kemguard 5040 LS | | | | | | 5.0% |
| Stability result | 120 F. 2 weeks | 120 F. 2 weeks | 120 F. 2 weeks | 120 F. 2 weeks | 120 F. 2 weeks | 120 F. 2 weeks |

Formulations such as those described may be manufactured as described above and sold. The formulations include slurried solid acrylamide polymer and scale inhibitor. The formulations exhibit long term stability. When small concentrations of the formulations are added to large volumes of water, such as for a fracturing fluid, the quaternary ammonium compound and/or salt are substantially diluted, allowing the acrylamide polymer to fully and rapidly hydrate to produce a friction reduction effect which may be sustained for a relatively long period. In addition, the scale inhibitor will gradually hydrate which provides long term scale inhibition.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An aqueous formulation, said formulation comprising:

(i) 5-50 wt % of a polymer (AA) which is a water-soluble polymer;

(ii) water;

(iii) 10-50 wt % of a quaternary ammonium compound; and (iv) 0.1-20 wt % of a scale inhibitor; and (v) 10-30 wt % of a calcium or magnesium halide.

2. The formulation according to claim 1, wherein said formulation includes 14 to 45 wt % of polymer (AA); and than 70 wt % of water.

3. The formulation according to claim 1, wherein said formulation includes at least 5 wt %, of said quaternary ammonium compound; and/or said formulation includes 55 wt % or less of said quaternary ammonium compound.

4. The formulation according to claim 1, wherein said polymer (AA) is a polyacrylamide and, preferably, said polymer (AA) is selected from an ionic polyacrylamide (especially an anionic acrylamide) and a neutral polyacrylamide.

5. The formulation according to claim 1, wherein said polymer (AA) includes:

a repeat unit of formula II which is preferably in combination with a repeat unit of formula I, wherein said repeat unit of formula II comprises a moiety:

II

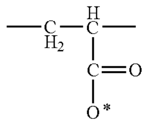

wherein the O* moiety is an $O^-$ moiety or is covalently bonded to another atom or group; or a repeat unit comprising a vinyl pyrrolidone moiety; or a repeat unit comprising a moiety of formula III

III

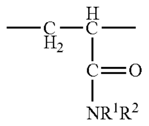

wherein $R^1$ and $R^2$ are independently selected from a hydrogen atom and an optionally-substituted alkyl group.

6. The formulation according to claim 1, wherein said polymer (AA) includes anionic repeat units that include sulfonate moieties.

7. The formulation according to claim 1, wherein said polymer (AA) is dispersed in said aqueous formulation as solid discrete particles and/or wherein said particles are in the form of powder, granules or flake.

8. The formulation according to claim 1, wherein said quaternary ammonium compound includes a quaternary ammonium cation and an anionic moiety, wherein said quaternary ammonium compound includes a moiety (XI)

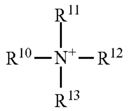

wherein $R^{10}$, $R^{11}$, $R^{12}$ and $R^{13}$ is each individually an optionally substituted alkyl (eg an aryl substituted alkyl), alkenyl or aryl group; or two of groups $R^{10}$, $R^{11}$, $R^{12}$ and $R^{13}$ may together define a cyclic structure; wherein, optionally, the anionic moiety is selected from a halide; salicylate; oxalate; bicarbonate; bitartarate; citrate; carbonate; dihydrogen citrate; nitrate; nitrite; phosphate; sulfate; sulfonate.

9. The formulation according to claim 1, wherein said quaternary ammonium compound is selected from choline chloride, tetramethyl ammonium chloride, tetraethylammonium chloride and tetrapropyl ammonium chloride.

10. The formulation according to claim 1, wherein said quaternary ammonium compound is choline chloride.

11. The formulation according to claim 1, wherein said aqueous formulation includes a salt (BB) in addition to components (i), (ii), (iii) and (iv), wherein said salt (BB) is not a quaternary ammonium compound.

12. The formulation according to claim 11, wherein said salt (BB) is a calcium or magnesium salt, wherein, optionally, the counter-ion of said salt (BB) is selected from halides.

13. The formulation according to claim 1, wherein said formulation is not a gel and/or does not gel.

14. The formulation according to claim 1, wherein said scale inhibitor includes a moiety (XX)

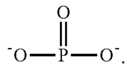

15. The formulation according to claim 1, wherein said scale inhibitor comprises a calcium or magnesium salt and/or a mixture of calcium and magnesium salts.

16. The formulation according to claim 1, wherein said scale inhibitor is selected from: 1-hydroxyethylidene-1,1-diphosphonic acid (editronic acid or HEDP), adenosine monophosphate (AMP), adenosine triphosphate (ATP), ethylenediamine tetra(methylene phosphonic acid) [EDTMP], Diethylenetriamine penta(methylene phosphonic acid) (DTPMP), bis(hexamethylene triamine penta(methylenephosphonic acid)) (BHMP), AEEA phosphonate [Aminoethylethanolamine tri(methylene phosphonate)]; and polymeric scale inhibitors.

17. The formulation according to claim 1, wherein said scale inhibitor includes a moiety (XX)

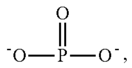

is an acrylate-based polymer, is a phosphonate-based polymer and/or includes a $SO_3^-$ moiety.

18. The formulation according to claim 1, wherein said scale inhibitor is a calcium or magnesium salt of a phosphonic acid.

19. The formulation according to claim 1, wherein said scale inhibitor is a salt of a diethylene triamine pentamethylene phosphonic acid or a bis-hexamethylene triamine pentamethylene phosphonic acid.

20. The formulation according to claim 1, said aqueous formulation comprising:

10-30 wt %, of a polymer (AA);

20-40 wt % water;

16-28 wt % of a quaternary ammonium compound;

10-30 wt % of a calcium or magnesium halide; and 1-10 wt %, of scale inhibitor.

21. The formulation according to claim 1, wherein the formulation includes other additives, selected from corrosion inhibitors, proppant particulates, acids, fluid loss control additives, biocides, surfactants, clay control additives, foamers, paraffin inhibitors, gelling agents, pH adjustment additives, buffers, cross-linkers, oxidizing agents, enzymes and gel degrading agents.

22. A method of preparing a treatment fluid, the method comprising:

(a) selecting an aqueous formulation according to claim 1; and (b) contacting the aqueous formulation with water.

23. The method according to claim 22, wherein said treatment fluid comprises 0.4-15 lb polymer (AA) per 1000 gal of treatment fluid and preferably includes 0.75-10 lbs polymer (AA) per 1000 gal fluid of treatment fluid.

24. The method according to claim 22, wherein, at some stage in the method, one or a plurality of proppants is incorporated into the treatment fluid and, optionally, at some stage in the method, said treatment fluid includes 2.9 to 54 wt % of proppants.

25. A treatment fluid, the treatment fluid comprising the aqueous formulation according to claim 1.

26. A method of treatment which comprises:

(A) selecting treatment fluid according to claim 25; and (B) contacting an area to be treated with said treatment fluid.

27. The method according to claim 26, wherein said treatment is selected form: slick water fracturing, water treatment, enhanced oil recovery, drilling, erosion control, dust abatement and mining flotation operations, wherein, preferably, said treatment is a slick water fracturing treatment.

28. An assembly positioned adjacent a subterranean formation and arranged to deliver a treatment fluid, said assembly comprising:

(I) a receptacle containing an aqueous formulation according to claim 1;

(II) a water supply;

(III) a pump (PI) and optional flow meter for dosing aqueous formulation from said receptacle into said water supply, suitably to define at least part of a slick water fracturing fluid;

(IV) a conduit for delivering treatment fluid; and (V) a pump (P2) for injecting treatment fluid.

29. The formulation according to claim 1, wherein the formulation comprises at least 20 wt % water.

30. The formulation according to claim 1, wherein said formulation includes 14 to 45 wt % of polymer (AA); and includes less than 80 wt % water.

31. The formulation according to claim 1, wherein said formulation includes at least 12 wt %, of said quaternary ammonium compound; and/or said formulation includes 45 wt % or less of said quaternary ammonium compound.

32. The formulation according to claim 1, wherein said polymer (AA) anionic repeat units that are styrene sulfonate or AMPS-based repeat units.

33. The formulation according to claim 1, wherein said aqueous formulation comprises:

10-30 wt %, of a polymer (AA);

20-40 wt % water;

16-28 wt % of a choline salt;

10-30 wt % of a calcium or magnesium halide; and 1-10 wt %, of scale inhibitor.

* * * * *